United States Patent
Kumar et al.

(10) Patent No.: US 11,564,178 B2
(45) Date of Patent: Jan. 24, 2023

(54) SOUNDING REFERENCE SIGNAL (SRS) TRANSMIT POWER CONTROL

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 127 days.

(21) Appl. No.: 17/144,429

(22) Filed: Jan. 8, 2021

(65) Prior Publication Data
US 2022/0225246 A1 Jul. 14, 2022

(51) Int. Cl.
| | |
|---|---|
| H04W 52/36 | (2009.01) |
| H04L 5/00 | (2006.01) |
| H04L 41/0803 | (2022.01) |
| H04W 24/08 | (2009.01) |
| H04W 64/00 | (2009.01) |
| H04W 72/04 | (2009.01) |
| H04W 74/08 | (2009.01) |

(52) U.S. Cl.
CPC .......... *H04W 52/36* (2013.01); *H04L 5/0048* (2013.01); *H04L 41/0803* (2013.01); *H04W 24/08* (2013.01); *H04W 64/00* (2013.01); *H04W 72/0453* (2013.01); *H04W 74/0833* (2013.01)

(58) Field of Classification Search
CPC .. H04L 5/0048; H04L 41/0803; H04W 24/08; H04W 64/00; H04W 72/0453; H04W 74/0833
See application file for complete search history.

(56) References Cited

U.S. PATENT DOCUMENTS

| | | | |
|---|---|---|---|
| 8,682,318 B2 * | 3/2014 | Lee ..................... | H04W 74/002 455/434 |
| 2003/0189949 A1 * | 10/2003 | Belaiche ........... | H04W 74/0866 370/462 |
| 2020/0252896 A1 * | 8/2020 | Lei ..................... | H04W 74/0833 |
| 2020/0374806 A1 | 11/2020 | Manolakos et al. | |

FOREIGN PATENT DOCUMENTS

WO   WO-2020145879 A2   7/2020

OTHER PUBLICATIONS

International Search Report and Written Opinion—PCT/US2021/056913—ISA/EPO—dated Feb. 22, 2022.

(Continued)

*Primary Examiner* — Kabir A Timory
(74) *Attorney, Agent, or Firm* — Thien T. Nguyen

(57) ABSTRACT

Transmit output power for an uplink (UL) positioning sounding reference signal (SRS) may be determined by measuring output power of a transmit chain of a user equipment (UE) during an unused RACH occasion. A transmit output power offset is determined based on a difference between the measured output power and a predetermined output power. The transmit output power offset may be used to adjust the power output of the UE.

30 Claims, 8 Drawing Sheets

(56) References Cited

OTHER PUBLICATIONS

Xiaomi: "Positioning Enhancements for RRC IDLE and RRC Inactive State UE," 3GPP Draft, 3GPP TSG RAN WG2 #111, R2-2007173, 3rd Generation Partnership Project (3GPP), Mobile Competence Centre, 650, Route Des Lucioles, F-06921, Sophia-Antipolis Cedex, France, vol. RAN WG2. No. e-Meeting; Aug. 17, 2020-Aug. 28, 2020, Aug. 7, 2020 (Aug. 7, 2020), XP051911993, pp. 1-4, Retrieved from the Internet: URL: https://ftp.3gpp.org/tsg_ran/WG2_RL2/TSGR2_111-e/Docs/R2-2007173.zip R2-2007173 Positioning enhancements for RRC IDLE and RRC Inactive state UE.doc [retrieved on Aug. 7, 2020] the whole document, section 2.3.

* cited by examiner

SOUNDING REFERENCE SIGNAL (SRS) TRANSMIT POWER CONTROL

BACKGROUND

Field

Subject matter disclosed herein relates to positioning of user equipment and more particularly to controlling the transmit power of a positioning sounding reference signal (SRS).

Information

The location of a user equipment (UE), such as a cellular telephone, may be useful or essential to a number of applications including emergency calls, navigation, direction finding, asset tracking and Internet service. The location of a UE may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station or a location server may send assistance data to the UE to assist in acquiring and measuring signals, and in some implementations, to compute a location estimate from the measurements. The UE may compute an estimate of its own location using various positioning methods or may send the positioning measurements to a network entity, e.g., location server, which may compute the UE location based on the positioning measurements. Improvements in efficiency and/or accuracy are desirable.

SUMMARY

The location of a user equipment (UE) may be determined based on uplink (UL) positioning signals (e.g., sounding reference signals (SRS)). Transmit output power for the UL positioning SRS may be determined by measuring output power of a transmit chain of the UE during an unused Random Access Channel (RACH) occasion. A transmit output power offset may be determined based on a difference between the measured output power and a predetermined output power. The transmit output power offset may be used to adjust the power output of the UE. The transmit output power offset may also be determined based on a characterization of the transmit chain and characteristics of the UL positioning SRS signal.

In some implementations, a method for supporting positioning of a user equipment (UE) in a wireless network performed by the UE, the method comprising: determining an unused random access channel (RACH) occasion for the UE, measuring an output power of a transmit chain of the UE during the determined unused RACH occasion, determining a transmit output power offset for a transmission of a positioning sounding reference signal (SRS) via the transmit chain of the UE based on the output power measurement, and transmitting the positioning SRS at a transmit output power based on the transmit output power offset.

In other implementations, a user equipment (UE) configured for supporting positioning of the UE in a wireless network comprising: a wireless transceiver configured to wirelessly communicate with entities in a wireless network, at least one memory, at least one processor coupled to the wireless transceiver and the at least one memory, wherein the at least one processor is configured to: determine an unused random access channel (RACH) occasion for the UE, measure an output power of a transmit chain of the UE during the determined unused RACH occasion, determine a transmit output power offset for a transmission of a positioning sounding reference signal (SRS) via the transmit chain of the UE based on the output power measurement, and transmit the positioning SRS at a transmit output power based on the transmit output power offset.

In other implementations, a user equipment (UE) configured for supporting positioning of the UE in a wireless network comprising: means for determining an unused random access channel (RACH) occasion for the UE, means for measuring an output power of a transmit chain of the UE during the determined unused RACH occasion, means for determining a transmit output power offset for a transmission of a positioning sounding reference signal (SRS) via the transmit chain of the UE based on the output power measurement, and means for transmitting the positioning SRS at a transmit output power based on the transmit output power offset.

In still other implementations, a non-transitory computer readable storage medium including program code stored thereon, the program code operable to configure at least one processor in a user equipment (UE) to support positioning, comprising: program code to determine an unused random access channel (RACH) occasion for the UE, program code to measure an output power of a transmit chain of the UE during the determined unused RACH occasion, program code to determine a transmit output power offset for a transmission of a positioning sounding reference signal (SRS) via the transmit chain of the UE based on the output power measurement, and program code to transmit the positioning SRS at a transmit output power based on the transmit output power offset.

In some implementations, a method for supporting positioning of a user equipment (UE) in a wireless network performed by the UE, the method comprising determining a configuration of a positioning sounding reference signal (SRS) for transmission through a transmit chain of the UE, determining a bandwidth and frequency of the positioning SRS based on the configuration of the positioning SRS, estimating, based at least on the frequency of the positioning SRS, a power drop of a transmission of the positioning SRS, and transmitting, via a transmit chain of the UE, the positioning SRS at a transmit output power based on the estimated power drop.

In another implementation, user equipment (UE) configured for supporting positioning of the UE in a wireless network comprising a wireless transceiver configured to wirelessly communicate with entities in a wireless network, at least one memory, and at least one processor coupled to the wireless transceiver and the at least one memory. The at least one processor may be configured to determine a configuration of a positioning sounding reference signal (SRS) for transmission through a transmit chain of the UE, determine a bandwidth and frequency of the positioning SRS based on the configuration of the positioning SRS, estimate, based at least on the frequency of the positioning SRS, a power drop of a transmission of the positioning SRS, and transmit, via a transmit chain of the UE, the positioning SRS at a transmit output power based on the estimated power drop.

In another implementation, a user equipment (UE) configured for supporting positioning of the UE in a wireless network comprising means for determining a configuration of a positioning sounding reference signal (SRS) for transmission through a transmit chain of the UE, means for determining a bandwidth and frequency of the positioning SRS based on the configuration of the positioning SRS, means for estimating, based at least on the frequency of the positioning SRS, a power drop of a transmission of the positioning SRS, and means for transmitting, via a transmit chain of the UE, the positioning SRS at a transmit output power based on the estimated power drop.

In another implementation, non-transitory computer readable storage medium including program code stored thereon, the program code operable to configure at least one processor in a user equipment (UE) to support positioning may include program code to determine a configuration of a positioning sounding reference signal (SRS) for transmission through a transmit chain of the UE, program code to determine a bandwidth and frequency of the positioning SRS based on the configuration of the positioning SRS, program code to estimate, based at least on the frequency of the positioning SRS, a power drop of a transmission of the positioning SRS, and program code to transmit, via a transmit chain of the UE, the positioning SRS at a transmit output power based on the estimated power drop.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
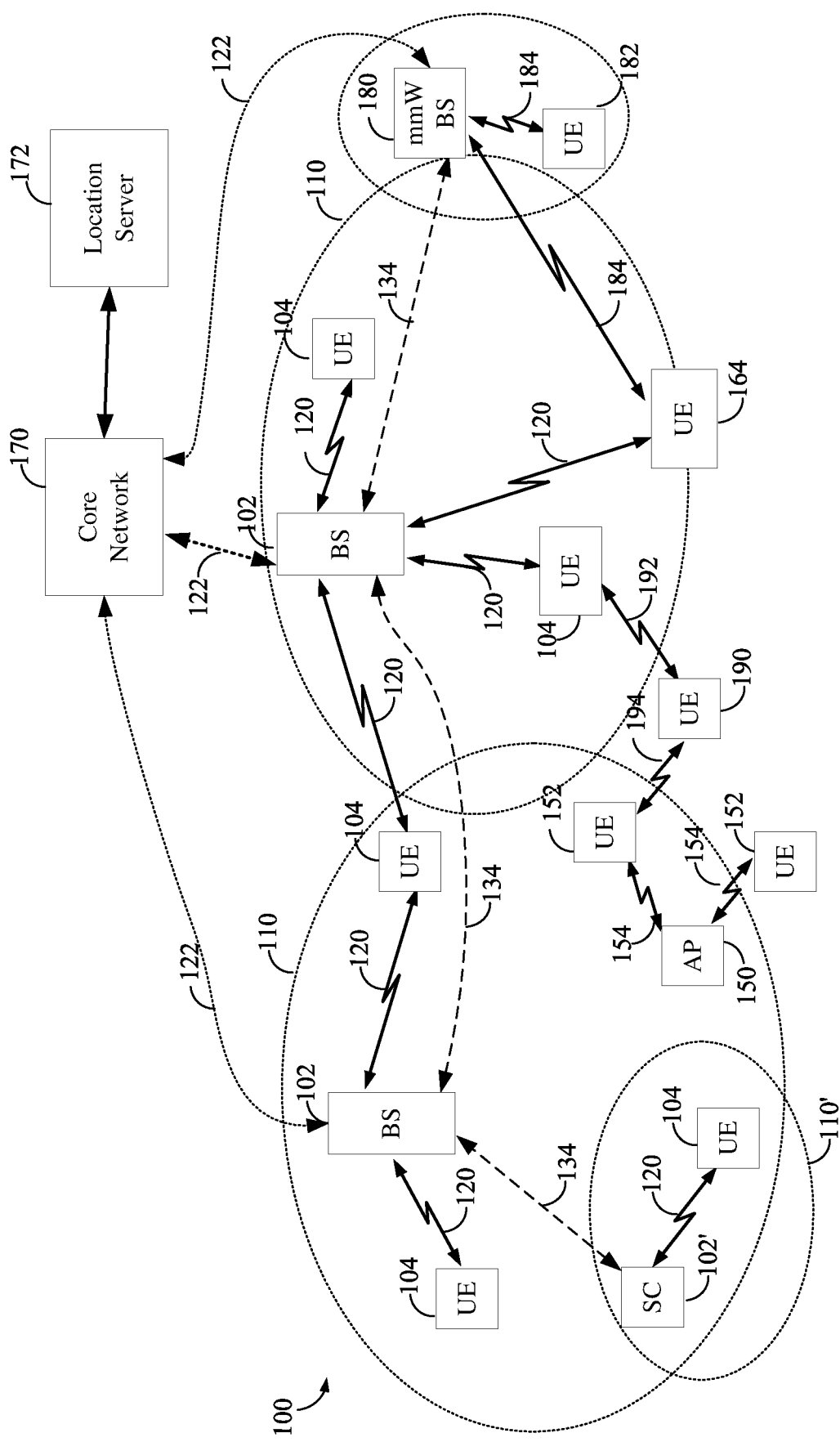
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AoD), Round Trip Time (RTT) or multi cell RTT (Multi-RTT), Enhanced Cell ID (ECID), or other position methods. Assistance data may be used by a UE to acquire and measure GNSS and/or reference signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning using signaling in LTE and 5G NR, a UE typically acquires a dedicated positioning signals transmitted by base stations, e.g., referred to as positioning reference signals (PRS), which are used to generate the desired measurements for the supported positioning technique. Positioning Reference Signals (PRS) are defined for 5G NR positioning to enable UEs to detect and measure more neighbor base stations or Transmission and Reception Points (TRPs). Several configurations are supported to enable a variety of deployments (indoor, outdoor, sub-6, mmW). To support PRS beam operation, beam sweeping is additionally supported for PRS.

Some positioning techniques may use DL, UL, or a combination of DL and UL positioning sounding reference signals (SRS). For example, DL positioning SRS signals may be used for TDOA and AoD positioning techniques. In another example, UL SRS positioning signals may be used for TDOA and AoA positioning techniques. In still another example, UL and DL positioning SRS may be used for Multi-RTT positioning techniques.

UL positioning SRS signals may be transmitted from the UE to a base station. A location server may use the positioning SRS to determine the location of the UE. The transmit output power of the positioning SRS is not specified in the same manner as non-positioning SRS signals. However, accurately controlling transmit output power can help ensure that the UL positioning SRS signal is correctly decoded by the network.

In some implementations, the transmit output power of UL positioning SRS signals may be controlled by measuring the output power of a transmit chain of the UE and comparing the measurement to a predetermined power level. The difference between the measured output power and the predetermined power level is referred to as a transmit output power offset. The transmit output power offset may be used to adjust the output power of a power amplifier in the transmit chain. In this manner, a power drop (sometimes called a power droop) associated with a UL positioning SRS signal can be corrected. In some other implementations, the transmit chain may be characterized through simulation or bench testing. The transmit output power offset may be controlled by using transmit output power offset values stored in a look-up table and retrieved based on characteristics of the UL positioning SRS signal. The UE may retrieve the transmit output power offset from the look-up table prior to transmitting UL positioning signals.

FIG. 1 illustrates an exemplary wireless communications system 100, according to various aspects of the disclosure. The wireless communications system 100 (which may also be referred to as a wireless wide area network (WWAN)) may include various base stations 102, sometimes referred to herein as TRPs 102, and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and to one or more location servers 172. Location server 172 is illustrated as connected to core network 170 for clarity, but it should be understood that location server 172 may be within the core network 170 or within a RAN, e.g., co-located with one or more base stations 102 (e.g., as a location server surrogate (LSS) or the like). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, multiple carriers are combined, either in the same or different bands, to increase the bandwidth available to increase the capacity of the link. The anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

If the UE 104/182 has dual connectivity (DC), the radio access node that provides the control plane connection to the core network in case of multi radio dual connectivity (MR-DC) is referred to as the master node, which may be a master eNB in EN-DC, a Master ng-eNB in NGEN-DC. A master cell group (MCG) is a group of serving cells associated with the master node, that includes the PCell and optionally one or more Scells. A secondary node is another radio access node, with no control plane connection to the core network, and that provides additional resources to the UE in case of MR-DC, which may be, e.g., an en-gNB in EN-DC or a Secondary ng-eNB (in NE-DC). A secondary cell group (SCG) is a group of serving cells associated with the secondary node, that includes the primary secondary cell (PSCell) and optionally one or more Scells. The PSCell is the cell that provides the initial access under the SCG.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2:
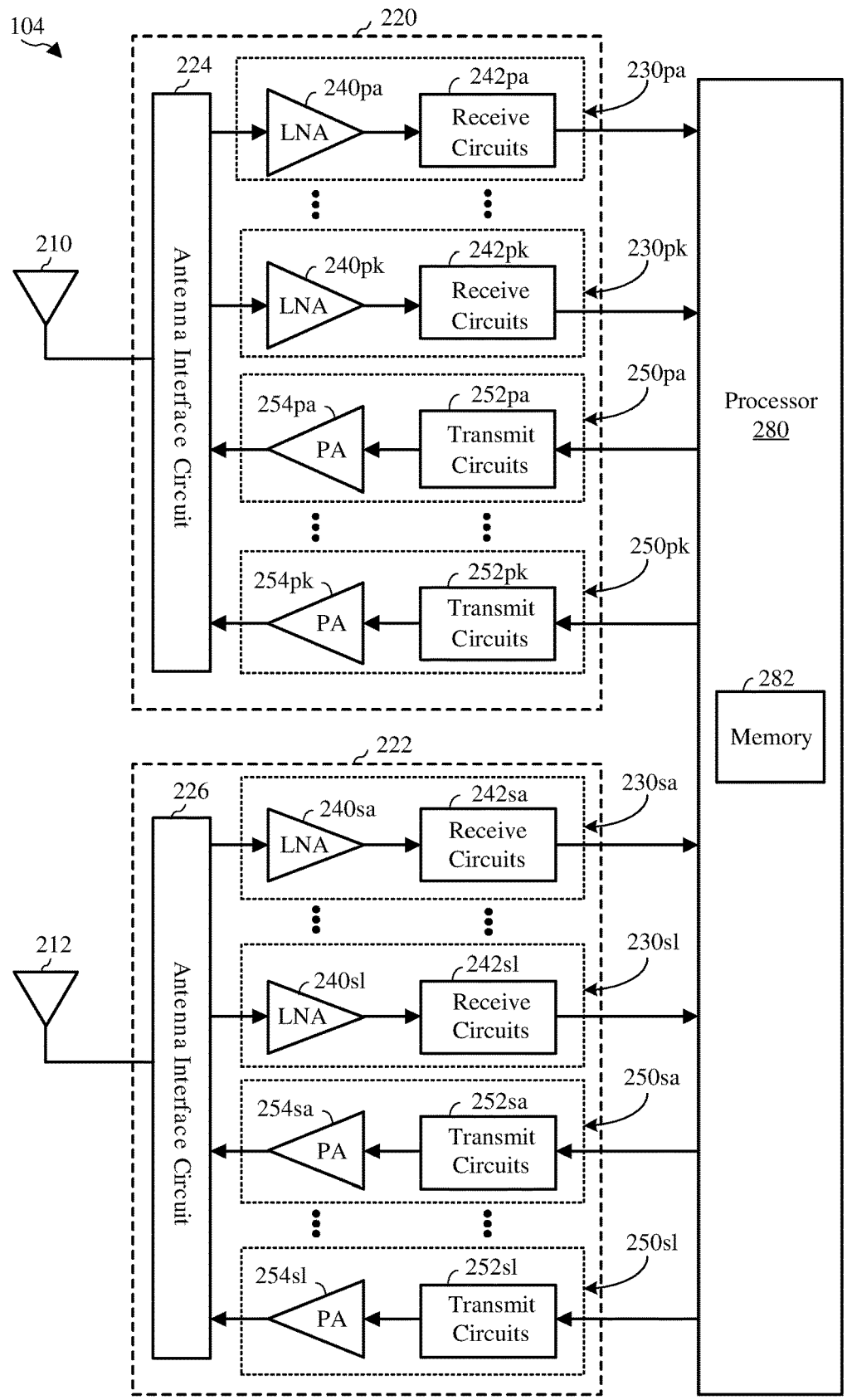
FIG. 2 shows a block diagram of an exemplary design of a user equipment in FIG. 1.

FIG. 2 shows a block diagram of an exemplary design of a UE 104 in FIG. 1. In this exemplary design, the UE 104 includes a primary transceiver 220 coupled to a primary antenna 210, a secondary transceiver 222 coupled to a secondary antenna 212, and a data processor/controller 280. In some implementations, additional or fewer antennas may be used. Primary transceiver 220 includes a number (K) of receivers 230pa to 230pk and a number (K) of transmitters 250pa to 250pk to support multiple frequency bands, multiple radio technologies, carrier aggregation, etc. Secondary transceiver 222 includes a number (L) of receivers 230sa to 230s1 and a number (L) of transmitters 250sa to 250s1 to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 2, each receiver 230 (sometimes referred to as a receive chain) includes a low noise amplifier (LNA) 240 and receive circuits 242. For data reception, primary antenna 210 receives signals from base stations and/or other transmitter stations and provides a received radio frequency (RF) signal, which is routed through an antenna interface circuit 224 and presented as an input RF signal to a selected receiver. Antenna interface circuit 224 may include switches, duplexers, transmit filters, receive filters, matching circuits, etc. The description below assumes that receiver 230pa is the selected receiver. Within receiver 230pa, an LNA 240pa amplifies the input RF signal and provides an output RF signal. Receive circuits 242pa down convert the output RF signal from RF to baseband, amplify and filter the down converted signal, and provide an analog input signal to data processor/controller 280. Receive circuits 242pa may include mixers, filters, amplifiers, matching circuits, an oscillator, a local oscillator (LO) generator, a phase locked loop (PLL), etc. Each remaining receiver 230 in transceivers 220 and 222 may operate in similar manner as receiver 230pa.

In the exemplary design shown in FIG. 2, each transmitter 250 (sometimes referred to as a transmit chain) includes transmit circuits 252 and a power amplifier (PA) 254. For data transmission, data processor/controller 280 processes (e.g., encodes and modulates) data to be transmitted and provides an analog output signal to a selected transmitter. The description below assumes that transmitter 250pa is the selected transmitter. Within transmitter 250pa, transmit circuits 252pa amplify, filter, and upconvert the analog output signal from baseband to RF and provide a modulated RF signal. Transmit circuits 252pa may include amplifiers, filters, mixers, matching circuits, an oscillator, an LO generator, a PLL, etc. A PA 254pa receives and amplifies the modulated RF signal and provides a transmit RF signal having the proper output power level. The transmit RF signal is routed through antenna interface circuit 224 and transmitted via primary antenna 210. Each remaining transmitter 250 in transceivers 220 and 222 may operate in similar manner as transmitter 250pa.

Each receiver 230 and transmitter 250 may also include other circuits not shown in FIG. 2, such as filters, matching circuits, etc. All or a portion of transceivers 220 and 222 may be implemented on one or more analog integrated circuits (ICs), RF ICs (RFICs), mixed-signal ICs, etc. For example, LNAs 240 and receive circuits 242 within transceivers 220 and 222 may be implemented on multiple IC chips, as described below. The circuits in transceivers 220 and 222 may also be implemented in other manners.

Data processor/controller 280 may perform various functions for the UE 104. For example, data processor/controller 280 may perform processing for data being received via receivers 230 and data being transmitted via transmitters 250. Data processor/controller 280 may control the operation of the various circuits within transceivers 220 and 222. A memory 282 may store program codes and data for data processor/controller 280. Data processor/controller 280 may be implemented on one or more application specific integrated circuits (ASICs) and/or other ICs.

Figure 3:
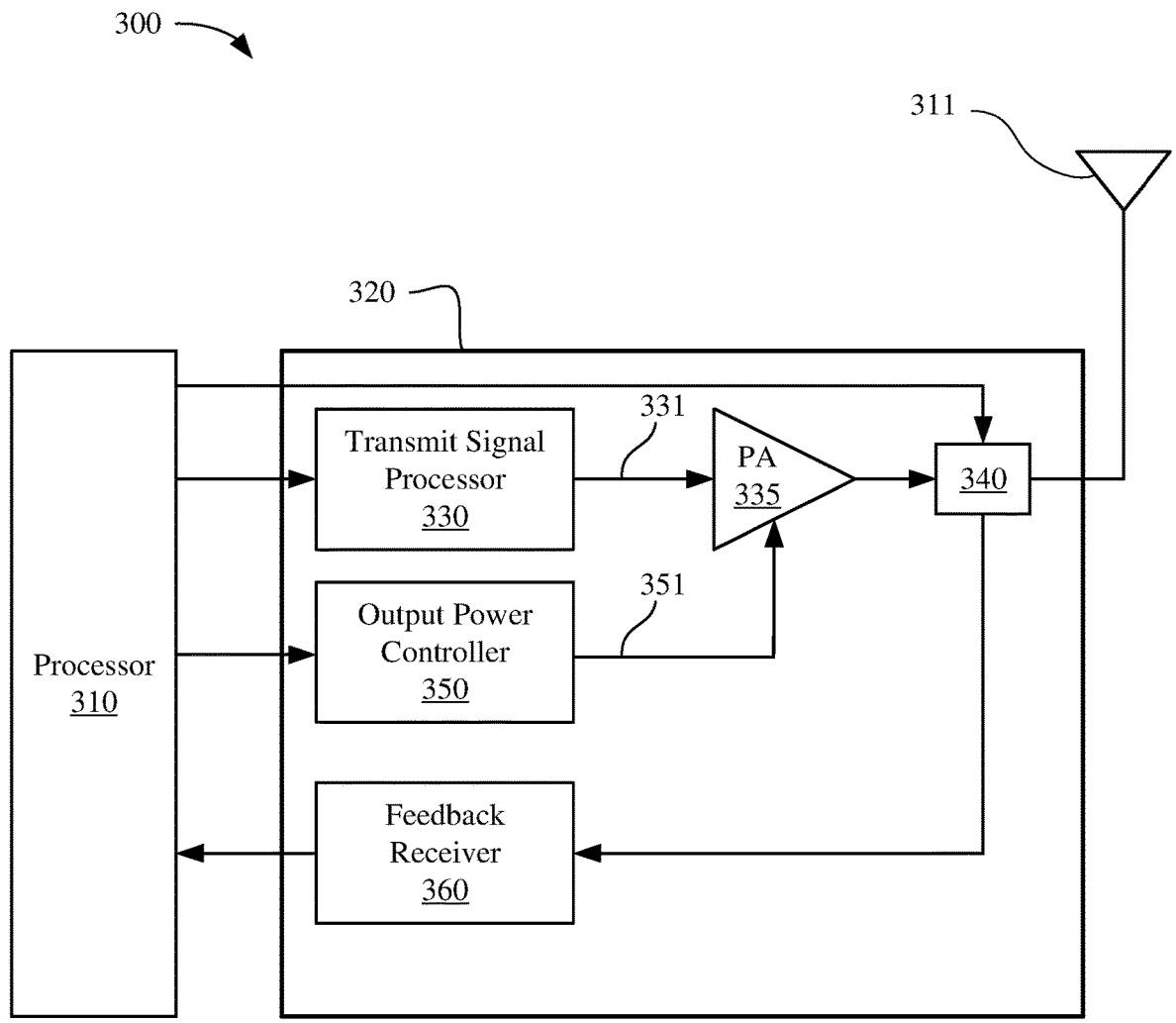
FIG. 3 shows a block diagram of an example transmitter of the user equipment of FIGS. 1 and 2.

FIG. 3 shows a block diagram of an example transmitter 300 of the UE 104 of FIGS. 1 and 2. The transmitter 300 may include a processor 310, an antenna 311, and a transmit chain 320. The processor 310 may be an implementation of the processor 280 of FIG. 2. Although only one transmit chain 320 and one antenna 311 is shown, in other implementations, the UE 104 may include any feasible number of transmit chains 320 and/or antennas 311.

The transmit chain 320 may include a transmit signal processor 330, a power amplifier 335, a configurable coupler 340, an output power controller 350, and a feedback receiver 360. The configurable coupler 340 and the feedback receiver 360 may enable the UE 104 to determine (e.g., measure) the transmit output power of the transmit chain 320. The UE 104 can compare the measured transmit output power to an expected transmit output power and correct or compensate for any determined output power differences.

The transmit signal processor 330 may process data from the processor 310 for transmission through one or more wireless channels and/or wireless frequencies. In some implementations, the transmit signal processor 330 may encode, modulate, and/or add error correction information to data received from the processor 330. In other implementations, the transmit signal processor 330 may perform any feasible signal processing operations on data from the processor 310. The transmit signal processor 330 may generate a transmit output signal 331 based on the processing performed by the transmit signal processor 330. The transmit output signal 331 may be coupled to the power amplifier 335.

The power amplifier 335 may amplify the transmit output signal 331 based on a gain control signal 351 provided by the output power controller 350. Thus, transmit output power may be controlled by the processor 310 through the output power controller 350. The output of the power amplifier 335 is coupled to the configurable coupler 340.

The configurable coupler 340 may couple the output of the power amplifier 335 to the antenna 311 and/r to the feedback receiver 360. In a first mode of operation, the configurable coupler 340 may couple the output of the power amplifier 335 to the antenna 311. In a second mode of operation, the configurable coupler 340 may couple the output of the power amplifier 335 to the feedback receiver 360 and isolate the output of the power amplifier 335 from the antenna 311. In some implementations, in the second mode of operation the configurable coupler 340 may attenuate, instead of isolate, the output of the power amplifier 335 to the antenna 311 while also coupling the output of the power amplifier 335 to the feedback receiver 360. For example, the configurable coupler 340 adjust or modify a loss and/or impedance coupling between the power amplifier 335 and the antenna 311.

The feedback receiver 360 may determine (e.g., measure) the transmit output power of the power amplifier 335 in the second mode of operation. In some implementations, the processor 310 may determine a power loss (sometimes referred to as power drop or power droop) associated with the transmit chain 320 with the feedback receiver 360. For example, the processor 310 may configure the transmit signal processor 330 and the output power controller 350 to transmit a signal (such as a positioning SRS signal) at a predetermined power level. In some implementations, the power level may be described by a specification, for example as described in Ref. 38.213 of Rel. 15 or Rel. 16 of the 3GPP specification. The processor 310 may measure the transmit output power of the transmit chain 320 using the feedback receiver 360. The processor 310 may compare the power measurement of the feedback receiver 360 to the predetermined power level to determine the power loss. In some implementations, the difference between the measured transmit output power and the expected transmit output power is referred to as a transmit output power offset. To compensate for the power loss, the processor 310 may cause the output power controller 350 to adjust the output gain 351 provided to the power amplifier 335. In some implementations, the UE 104 may transmit a positioning SRS signal via the transmit chain 320 using a transmit output power offset, where the transmit power offset is based on a transmit output power measurement performed during an unused random access channel (RACH) occasion.

For example, the processor 310 may determine an unused RACH occasion. RACH procedures are typically used by the UE 104 to access and/or synchronize to a network. RACH procedures may occur during any RACH occasion. (Determining unused RACH occasions is described in more detail below with respect to FIG. 4.)

Next, the processor 310 may measure the output power of the transmit chain 320. In some implementations, the processor 310 may configure the transmit signal processor 330 and/or the power amplifier 335 to transmit a positioning SRS signal. Thus, the processor 310 may configure the transmit signal processor 330 to transmit a UL positioning SRS signal in accordance with a UL SRS configuration message received from the location server 172. The UL SRS configuration may specify frequency, allocated frequency resources, bandwidth, resource blocks and/or any other feasible characteristics of the positioning SRS signal.

To measure the output power, the processor may configure the configurable coupler 340 to couple the output of the power amplifier 335 to the feedback receiver 360. When measuring the output power, the configurable coupler 340 may isolate the antenna 311 from the power amplifier 335. In some implementations, the configurable coupler may not completely isolate the antenna 311, but may instead attenuate the signal from the power amplifier 335 to the antenna 311 to ensure that the SRS positioning signal with very little output power is transmitted.

The feedback receiver 360 may measure the output power of the power amplifier 335. In some implementations, the processor 310 can compare the measured output power to the power of a reference signal such as a non-positioning SRS signal as described in Ref 38.213 of Rel. 15 or Rel. 16 of the 3GPP specification. In other implementations, the processor 310 may compare the measured output power to any feasible signal. The difference in output power may be a transmit output power offset.

In some implementations, the processor 310 may measure output power of the power amplifier 335 when differences between characteristics (frequency, allocated frequency resources, bandwidth, resource blocks, relationship of the frequency of the positioning SRS signal and the edge of the frequency band, and the like) of the positioning SRS signal and the non-positioning SRS signal are greater than a threshold. For example, the processor 310 may measure the output power of the power amplifier 335 when the difference between the frequency of the positioning SRS signal and the non-positioning SRS signal is greater than a threshold.

In some other implementations, the processor 310 may measure output power of the power amplifier 335 when a temperature associated with the transmit chain 320 changes by more than a threshold amount. By way of example and not limitation, one example of a temperature threshold may be a temperature change that exceeds eight degrees Celsius. Other temperature thresholds are possible. The processor 310 may also measure output power of the power amplifier 335 when a change of state of the power amplifier 335 is detected. Those skilled in the art will appreciate that different amplifier states (e.g., transmit chain 320 and/or power amplifier 335 operating modes) may be associated with different output gain settings. The processor 310 may also measure output power of the power amplifier 335 when a change in allocation of SRS resources is detected. In some implementations, a change in allocation of SRS resources may refer to a different configuration or use of frequency resource blocks associated with the positioning SRS signal.

Since the transmit output power offset may indicate an output power error (with respect to the reference signal), the processor 310 may use the transmit output power offset to correct the power level of a transmitted positioning SRS signal. In some implementations, the processor 310 may control the transmit power of the power amplifier 335 through the output gain 351 provided by the output power controller 350. In this manner, the processor 310 may use the transmit output power offset to control and/or adjust the transmit output power of the transmit chain 320. In some implementations, the processor 310 may determine unused RACH occasions that occur prior to an upcoming UL positioning SRS transmission. Therefore, the transmit output power offset may be determined before the upcoming UL positioning SRS transmission.

In another example, the transmit output power offset may be determined based on characterizations of the transmit chain 320 and transmit output power data stored in a look-up table. In some implementations, performance of the transmit chain 320 may be characterized through bench testing and/or simulation. That is, the transmit output power of the transmit chain 320 may be characterized with respect to frequency, allocated frequency resources, bandwidth, resource blocks, or any other feasible signal characteristics.

Next, the processor 310 may determine characteristics of a UL positioning SRS signal. As described above, the processor 310 may determine characteristics (frequency, allocated frequency resources, bandwidth, resource blocks, relationship of the frequency of the positioning SRS signal and the edge of the frequency band, and the like) through the UL SRS configuration message received from the location server 172.

The processor 310 may then estimate the transmit output power offset based on the characteristics of the UL positioning SRS signal. In some implementations, the processor 310 may retrieve the transmit output power offset values associated with the characteristics of the UL positioning SRS signal from the look-up table. The processor 310 may also determine a reference output power associated with a non-positioning SRS signal, for example, as described with respect to Ref 38.213 of Rel. 15 or Rel. 16 of the 3GPP specification. In some implementations, the processor 310 may add the transmit output power offset to the reference output power to determine the total transmit output power for the transmit chain 320.

Figure 4:
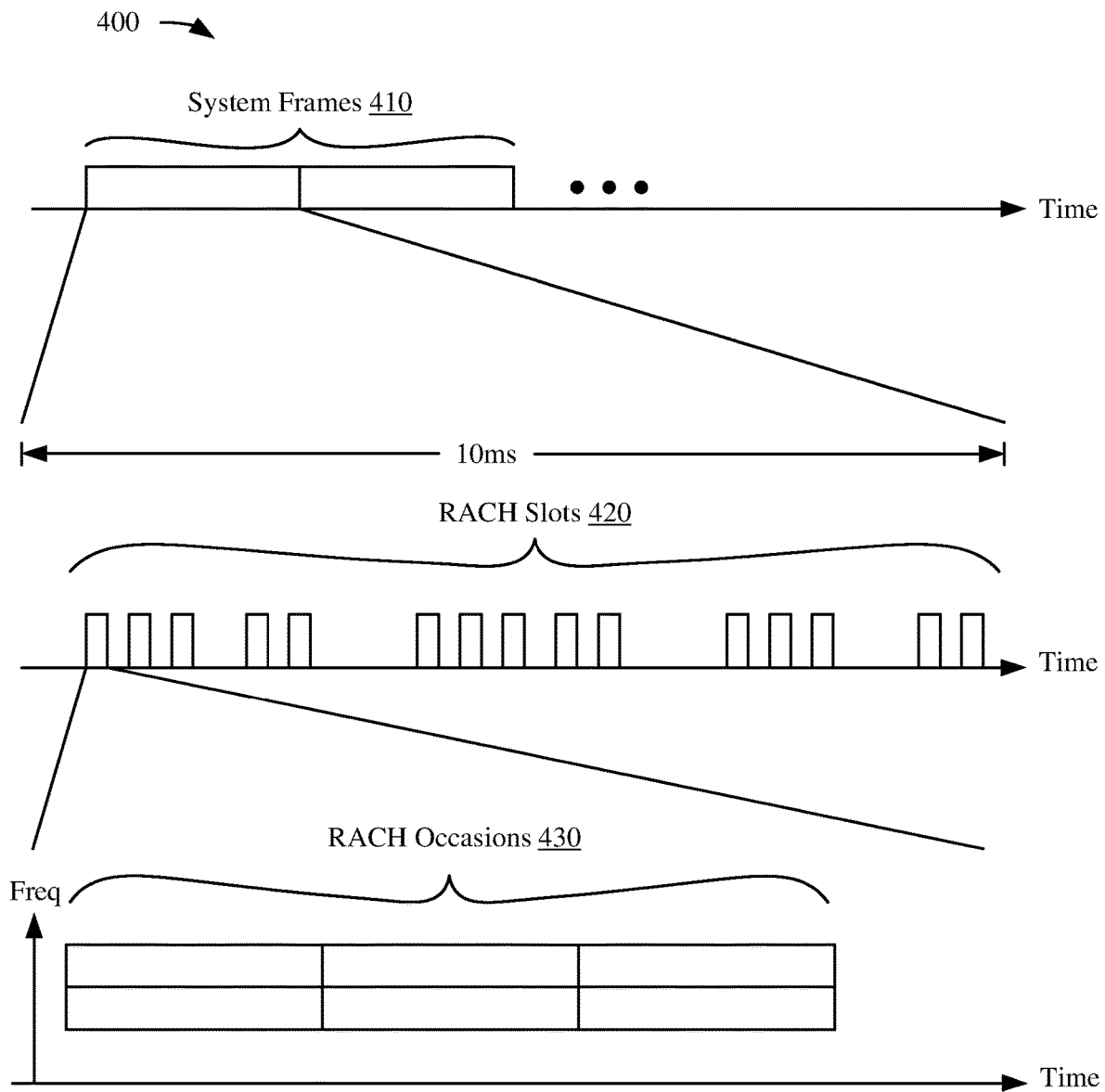
FIG. 4 shows a simplified diagram illustrating RACH occasions, in accordance with some implementations.

In some implementations, the processor 310 may estimate the transmit output power offset when a temperature associated with the transmit chain 320 changes by more than a threshold amount. In some other implementations, the processor 310 may estimate the output power offset when a change of state of the power amplifier 335 is detected. The processor 310 may also estimate the transmit output power offset when a change in allocation of SRS resources is detected FIG. 4 shows a simplified diagram 400 illustrating RACH occasions, in accordance with some implementations. A RACH procedure is typically used by the UE to access and/or synchronize to a network. RACH procedures may occur during any RACH occasion.

UL and DL transmissions are divided into system frames 410. Each system frame 410 may have a duration of 10 ms. Further, each system frame 410 may be divided into 10 subframes, each subframe having a duration of 1 ms. Each subframe may further be divided into two slots, each slot having a duration of 0.5 ms (subframes and slots not shown for simplicity).

Each system frame 410 may include a number of RACH slots 420. Each RACH slot 420 may include one or more RACH occasions 430. Not all RACH occasions 430 are unused, however. To determine the unused RACH occasions 430 available to the UE 104, the UE 104 may first determine a group of RACH occasions 430 that are over a predetermined time duration. The UE 104 may remove RACH occasions 430 from that group that conflict with semi-static DL and UL messages, remove RACH occasions 430 that conflict with synchronization signal blocks (SSBs), and remove RACH occasions 430 that are not associated with SSBs. Any RACH occasions 430 remaining in the group may be an unused RACH occasion suitable for determining the transmit output power offset as described with respect to FIG. 3.

Figure 5:
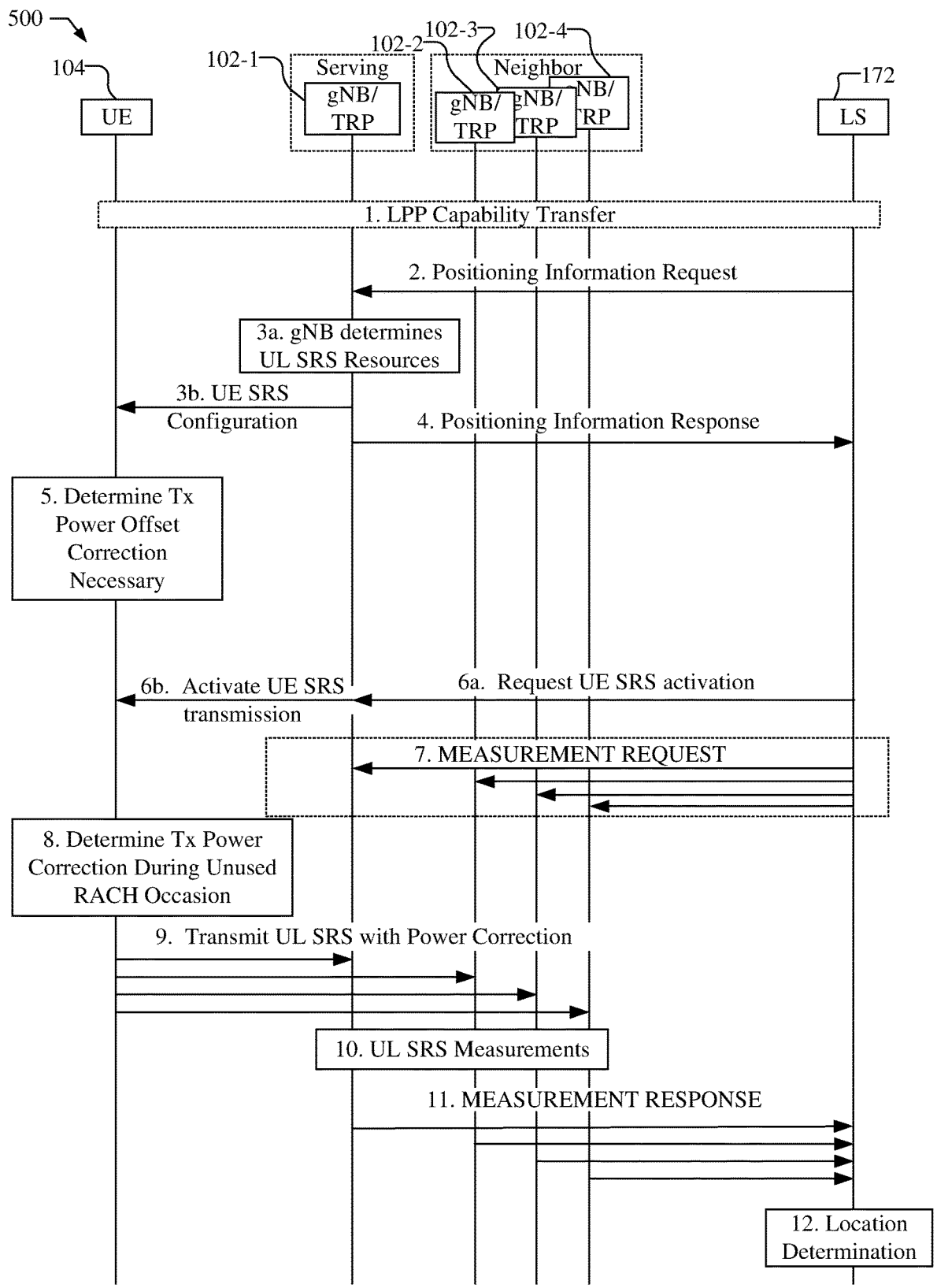
FIG. 5 is a message flow diagram illustrating the messaging between a location server, gNBs, including the location server surrogate, and the user equipment for a user equipment assisted positioning procedure, such as any feasible procedure where the user equipment transmits a positioning sounding reference signal.

FIG. 5 is a message flow diagram illustrating the messaging between the location server 172, the gNBs 110, and the UE 104 for a UE assisted positioning procedure, such as any feasible procedure where the UE 104 transmits a positioning SRS. The serving gNB 110-1 and multiple neighboring gNBs 110-2, 110-3, and 110-4 may sometimes be collectively referred to as gNBs 110. Although not shown here for simplicity, functionality of the location server 172 may be provided by one or more gNBs 110, the core network, external to the core network, the RAN, by a location server surrogate in the RAN, or any other feasible device. The positioning procedure illustrated in FIG. 5 shows UL positioning SRS messages for simplicity. In other implementations, other UL positioning messages and related procedures may be used. Accordingly, the procedure may be used with any UL or DL+UL based positioning measurements, such as UL TDOA, UL AOA, RTT, multi-cell RTT or some combination of these. By way of example and not limitation, UL positioning SRS messages may be used to support UL position methods such as UL TDOA or UL AOA in which gNBs 110 measure UL positioning SRS signals from UE 104. It should be understood that while FIG. 5 is described with reference to gNBs, other types of base stations may be used, such as eNBs, ng-eNBs, etc.

At stage 1, the location server 172 may request the positioning capabilities of the UE 104 by, for example, using an LPP Capability Transfer procedure, e.g., described in 3GPP TS 38.305.

At stage 2, the location server 172 sends a positioning information request message to the serving gNB 110-1 to request UL information for the UE 104. In some implementations, the positioning information request may be an NRPPa positioning information request.

At stage 3a, the serving gNB 110-1 determines the resources available for UL SRS signals and configures the UE 104 with a UL SRS configuration message at stage 3b. In some implementations, the SRS configuration message may include SRS signal information associated with one or more positioning SRS messages, including for example, information regarding frequency, allocated frequency resources, bandwidth, channel, and/or resource blocks associated with the positioning SRS messages.

At stage 4, the serving gNB 110-1 provides the UL SRS configuration information to the location server 172 in a positioning information response message. In some implementations, the positioning information response message may be a NRPPa positioning information response message.

At stage 5, the UE 104 determines whether a transmit output power offset is necessary for a positioning SRS signal. For example, the UE 104 may transmit, or plan to transmit, a positioning SRS signal as specified in the UL SRS configuration message received at stage 3b. The UE 104 may determine if the characteristics of the positioning SRS signal is sufficiently similar to a previously transmitted signal (e.g., a previously transmitted UL signal, including, but not limited to, physical uplink shared channel (PUSCH), physical uplink control channel (PUCCH), and/or non-positioning SRS signals).

If the difference between characteristics of the positioning SRS signal and a previously transmitted signal (such as an UL signal) are less than or equal to a threshold, then no transmit output power offset may be necessary. On the other hand, if the difference between characteristics of the positioning SRS signal and the previously transmitted signal are greater than a threshold, then the transmit power may be adjusted by, for example, a transmit power offset amount, as discussed in stage 8.

In some implementations, the UE 104 may determine if the difference between resource block associated with the positioning SRS signal and a previously transmitted signal. If the differences in resource blocks are less than a threshold, then no transmit output power offset may be necessary. On the other hand, if the differences in resource blocks are greater than a threshold, then the transmit power may be adjusted. In some other implementations, the UE 104 may determine if the resource blocks of the positioning SRS signal are within a threshold of an edge of a carrier bandwidth. If the resource blocks are within a threshold of an edge of a carrier bandwidth, then the UE may adjust the transmit power of the positioning SRS signal.

In some implementations, the UE 104 may determine that one or more operating conditions may exist or have been met that indicate that a determination of a transmit output power offset is necessary for a positioning SRS signal. For example, if a temperature change greater than a threshold is detected, a change in a state of a power amplifier in the transmit chain 320 is determined, and/or a change in an allocation of SRS resources is detected, then the UE 104 may determine that the transmit output power offset should be determined.

At stage 6a, the location server 172 sends a request UE SRS activation message to the serving gNB 110-1. At stage 6b, the serving gNB 110-1 activates the UE SRS transmission.

At stage 7, the location server 172 provides the UL information to the selected gNBs 110 in a Measurement Request message. The Measurement Request message may include an indication that the serving gNB 110-1 will be used. The Measurement Request message includes all information required to enable the gNBs/TRPs 110 to perform the UL measurements.

At stage 8, the UE 104 determines a transmit output power offset during an unused RACH occasion or based on a characterization of the transmit chain 320. For example, if as determined at stage 5, a transmit output power offset is needed for UL positioning SRS messages, then the UE 104 may determine the transmit output power offset by measuring a transmit output power during an unused RACH occasion. Unused RACH occasions may be determined as described above with respect to FIG. 4. In another example, the unused RACH occasion may occur prior to a scheduled transmission of a positioning SRS signal. In some implementations, the transmit output power offset values of the transmit chain 320 may be stored by a look-up table and retrieved based on characteristics of the UL positioning SRS signal. The transmit output power offset value may be added to the reference output power to determine the total transmit output power. Details regarding the determination of a transmit output power offset is described in more detail, e.g., in FIG. 3 and below with respect to FIGS. 7 and 8. In some implementations, determining the transmit output power offset may include determining a difference between an output power of a non-positioning SRS signal and a measured output power.

At stage 9, the UE 104 transmits UL positioning SRS messages with a transmit output power offset to one or more gNBs 102.

At stage 10, each gNB 102 measures the UL positioning SRS transmissions from the UE 104.

At stage 11, the gNBs 102 transmit a measurement response to the location server 172. In some implementations, the measurement response may include the SRS measurements associated with the UL positioning SRS messages performed at stage 10.

At stage 12, the location server 172 determines the location of the UE 104 based on the measurement responses received at stage 11.

Figure 6:
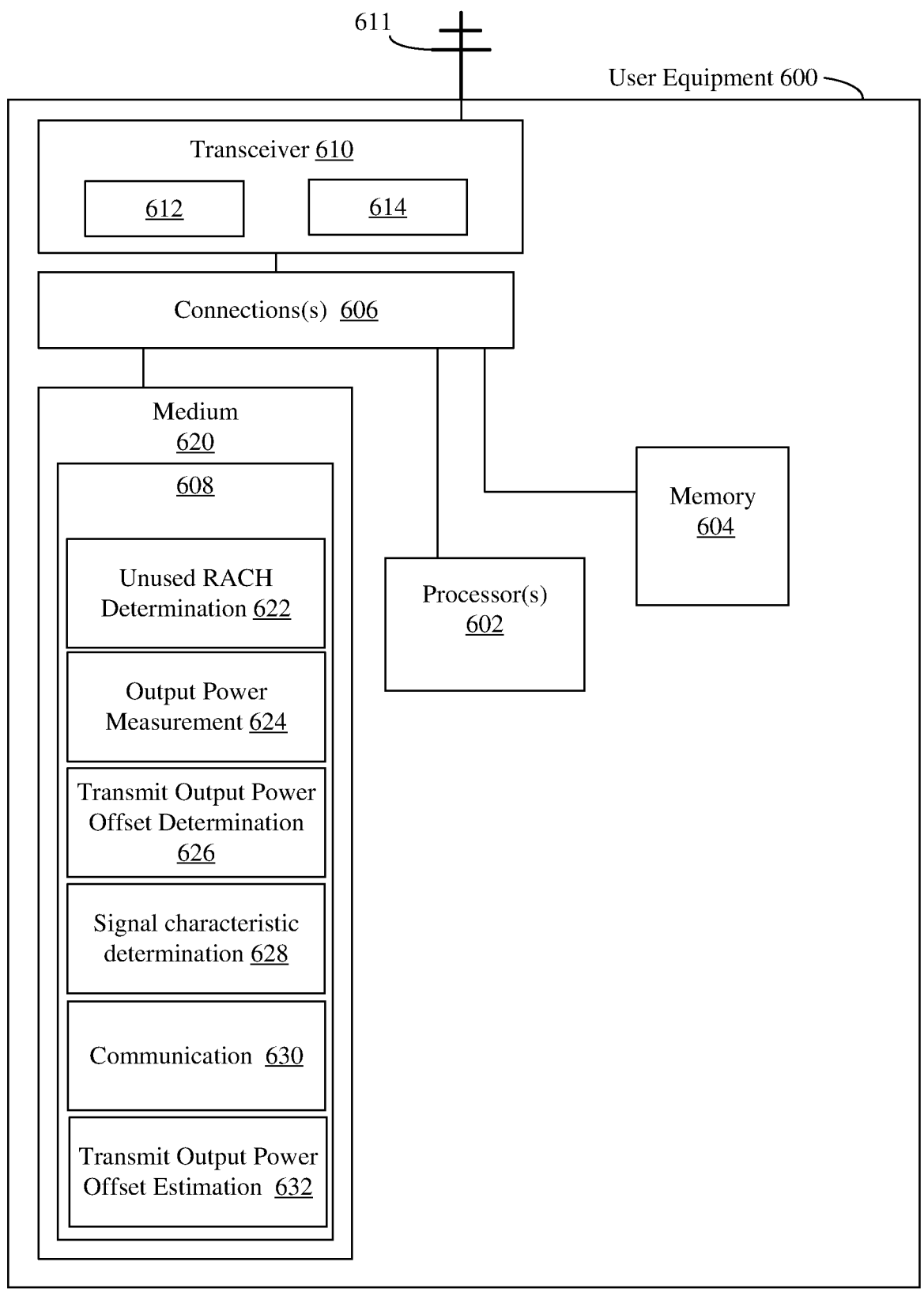
FIG. 6 shows a block diagram illustrating certain exemplary features of a user equipment that is configured to perform positioning within a wireless network, as described herein.

FIG. 6 shows a block diagram illustrating certain exemplary features of a UE 600 that is configured to perform positioning within a wireless network, as described herein. The UE 600 may be an example of the UEs 104 of FIGS. 1 and 2. in a manner consistent with disclosed implementations. The UE 600 may, for example, include one or more processors 602, memory 604, an external interface such as at least one wireless transceiver 610 (e.g., wireless network interface), which may be operatively coupled with one or more connections 606 (e.g., buses, lines, fibers, links, etc.) to a non-transitory computer readable medium 620 and memory 604. The UE 600 may further include additional items, which are not shown, such as a user interface that may include e.g., a display, a keypad or other input device, such as virtual keypad on the display, through which a user may interface with the UE. In certain example implementations, all or part of UE 600 may take the form of a chipset, and/or the like. Wireless transceiver 610 may, for example, include a transmitter 612 enabled to transmit one or more signals over one or more types of wireless communication networks and a receiver 614 to receive one or more signals transmitted over the one or more types of wireless communication networks.

In some implementations, UE 600 may include a UE antenna 611, which may be internal or external. UE antenna 611 may be used to transmit and/or receive signals processed by wireless transceiver 610. In some embodiments, UE antenna 611 may be coupled to wireless transceiver 610. In some implementations, measurements of signals received (transmitted) by UE 600 may be performed at the point of connection of the UE antenna 611 and wireless transceiver 610. For example, the measurement point of reference for received (transmitted) RF signal measurements may be an input (output) terminal of the receiver 614 (transmitter 612) and an output (input) terminal of the UE antenna 611. In a UE 600 with multiple UE antennas 611 or antenna arrays, the antenna connector may be viewed as a virtual point representing the aggregate output (input) of multiple UE antennas.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of UE 600.

The medium 620 and/or memory 604 may store instructions or program code 608 that contain executable code or software instructions that when executed by the one or more processors 602, cause the one or more processors 602 to operate as a special purpose computer programmed to perform the techniques disclosed herein. As illustrated in UE 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in UE 600 is merely exemplary, and as such the functionality of the modules and/or data structures may be combined, separated, and/or be structured in different ways depending upon the implementation of the UE 600.

The medium 620 and/or memory 604 may include an unused RACH determination module 622 that when implemented by the one or more processors 602 configures the one or more processors 602 to determine unused RACH occasions. In some implementations, execution of the unused RACH determination module 622 may cause the UE 600 to select an unused RACH occasion from available RACH occasions. In some other implementations, execution of the unused RACH occasion module 622 may cause the UE 600 to select an unused RACH occasions that occur before a transmission of a UL positioning SRS message.

The medium 620 and/or memory 604 may include an output power measurement module 624 that, when implemented by the one or more processors 602, configures the one or more processors 602 to determine (e.g., measure) output power from the transceiver 610 during an unused RACH occasion. In some implementations, execution of the output power measurement module 624 may cause the UE 600 to isolate or attenuate the output of the transceiver 610 from the antenna 611 prior to measuring the output power of the transceiver 610.

The medium 620 and/or memory 604 may include a transmit output power offset determination module 626 that, when implemented by the one or more processors 602, configures the one or more processors 602 to determine an transmit output power offset for the transceiver 610. In some implementations, execution of the transmit output power offset determination module 626 may cause the UE 600 to determine a transmit power difference between positioning and non-positioning SRS signals. In some implementations, execution of the transmit output power offset determination module 626 may cause UE 600 to determine a temperature change greater than a threshold. In some implementations, execution of the transmit output power offset determination module 626 may cause UE 600 to determine a change of a state in a power amplifier of the transceiver 610. In some implementations, execution of the transmit output power offset determination module 626 may cause UE 600 to determine a change in an allocation of SRS resources.

In some implementations, execution of the transmit output power offset determination module 626 may cause the UE 600 to configure the transmit chain 320 (e.g., the transceiver 610) to transmit a positioning SRS signal. The UE 600 may then transmit the positioning SRS signal and measure, via the feedback receiver 360 the output power of the transmit chain 320. The feedback receiver 360 may measure the output power. Further, in some implementations, the UE 600 may prevent transmitting the positioning SRS signal while measuring output power.

The medium 620 and/or memory 604 may include a signal characteristic determination module 628 that when implemented by the one or more processors 602 configures the one or more processors 602 to determine signal characteristics associated with positioning SRS signals. In some implementations, execution of the signal characteristic determination module 628 may cause the UE 600 to determine frequency, bandwidth, and/or resource block characteristics associated with a positioning SRS signal that may be transmitted through transmit chain 320 (e.g., the transceiver 610).

The medium 620 and/or memory 604 may include a communication module 630 that when implemented by the one or more processors 602 configures the one or more processors 602 to communicate with wireless devices such as one or more network entities or any other feasible wireless device. In some implementations, execution of the communication module 630 may cause the UE 600 to wirelessly communicate with a plurality of network entities simultaneously. In some other implementations, execution of the communication module 630 may cause the UE 600 receive UL SRS configuration messages and transmit positioning and non-positioning SRS signals. In some implementations, execution of the communication module 630 may cause the UE 600 to transmit a measurement response to the location server 172.

The medium 620 and/or memory 604 may include a transmit output power offset estimation module 632 that when implemented by the one or more processors 602 configures the one or more processors 602 to estimate the transmit output power of the transceiver 610. In some implementations, execution of the transmit output power offset determination module 632 may cause UE 600 to retrieve the transmit output power offset values from a look-up table. The transmit output power offset data may be stored in the look-up table based on characterizations of the transceiver 610 and may be used to estimate the transmit output power offset. In some implementations, the transmit output power offset values in the look-up table may be determined based on a characterization (such as a simulation and/or bench test data) associated with the transceiver 610.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program 608. For example, the non-transitory computer readable medium including program code 608 stored thereon may include program code 608 to support positioning of a UE in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a wireless transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable code 608 stored thereon, which if executed by one or more processors 602 may be operatively enabled to perform all or portions of the example operations as described herein. Computer readable medium 620 may be a part of memory 604.

Figure 7:
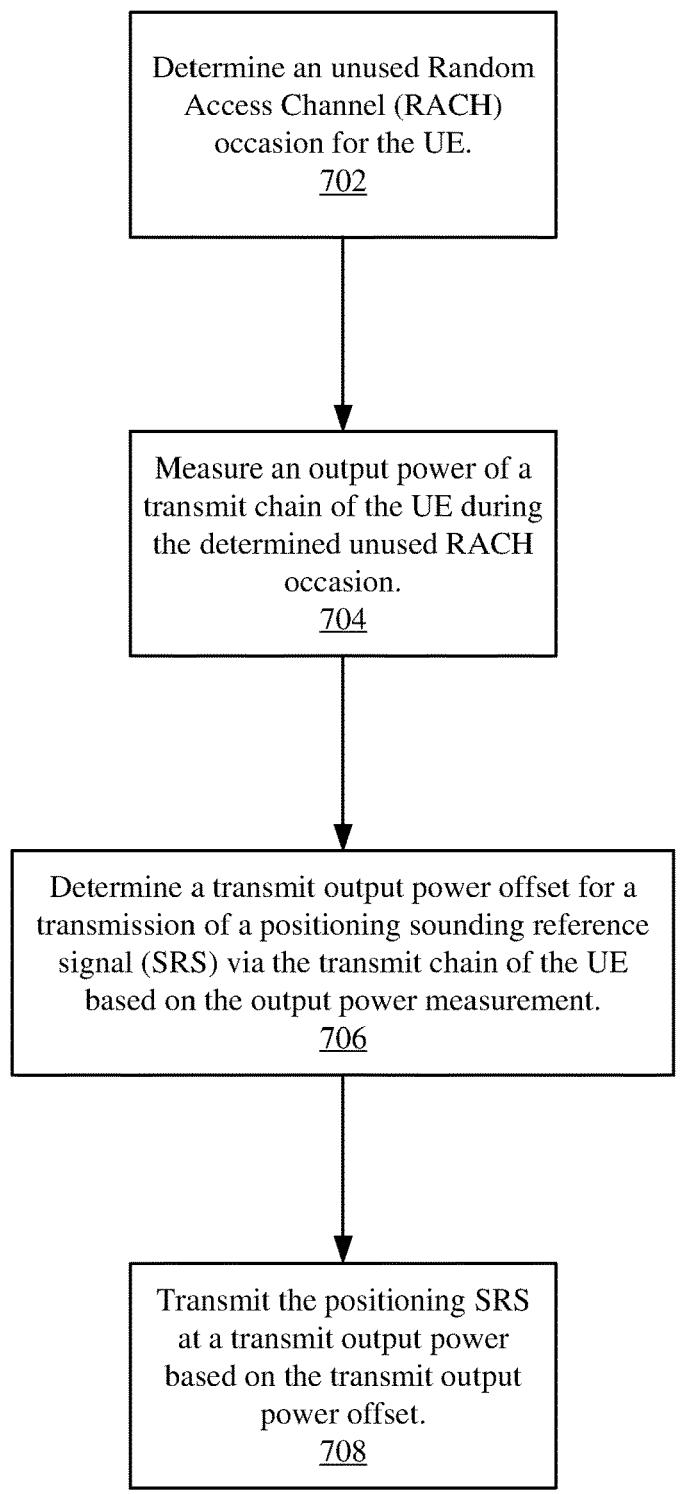
FIG. 7 shows a flowchart for an exemplary method for supporting positioning of a user equipment in a wireless network performed by a user equipment, such as the user equipment as shown in FIGS. 1 and 2 in a manner consistent with disclosed implementations.

FIG. 7 shows a flowchart for an exemplary method 700 for supporting positioning of a user equipment (UE) in a wireless network performed by a UE, such as the UE 104 as shown in FIGS. 1 and 2 in a manner consistent with disclosed implementations.

At block 702, the UE 104 determines an unused random access channel (RACH) occasion for the UE. As described with respect to FIG. 4, multiple RACH slots are distributed within each system frame. Each RACH slot may include a number of RACH occasions during which the UE 104 may perform a RACH procedure. Of the available RACH occasions, the UE 104 may determine an unused RACH occasion. In some implementations, the UE 104 may determine a group of RACH occasions that are over 160 ms in duration. The UE 104 may remove RACH occasions from that group that conflict with semi-static DL and UL messages, remove RACH occasions that conflict with SSBs, and remove RACH occasions that are not associated with SSBs. The remaining RACH occasions may be considered as unused RACH occasions. In some implementations, the unused RACH occasions may be selected from unused RACH occasions that occur before any positioning SRS signals are scheduled to be transmitted, for example as described at block 708. A means for determining an unused random access channel (RACH) occasion for the UE 104 may include, e.g., the wireless transceiver 610 and one or more processors 602 with dedicated hardware or implementing executable code or software instructions in memory 604 and/or medium 620 such as the unused RACH determination module 622 in UE 600 shown in FIG. 6.

At block 704, the UE 104 measures an output power of the transmit chain 320 of the UE during the determined unused RACH occasion. For example, the output of the power amplifier 335 of the transmit chain 320 may be coupled to the feedback receiver 360 that is configured to measure the transmit output power. A means for measuring an output power of a transmit chain of the UE 104 during the determined unused RACH occasion may include, e.g., the wireless transceiver 610 and one or more processors 602 with dedicated hardware or implementing executable code or software instructions in memory 604 and/or medium 620 such as the transmit output power offset determination module 626. In some implementations, the output of the power amplifier 335 may be coupled to the feedback receiver 360 and antenna 311 through a configurable coupler 340. The configurable coupler 340 may prevent the transmission of the positioning SRS via the antenna 311 associated with the transmit chain 320. In some other implementations, the configurable coupler 340 may isolate (e.g., disconnect) the antenna 311 from the output of the power amplifier 335 while the feedback receiver 360 measures output power.

In some implementations prior to measuring output power, the UE 104 may configure the transmit chain 320 to transmit a UL positioning SRS signal, where characteristics of the UL positioning SRS signal may be based on a UL SRS configuration message as described with respect to stage 3b of FIG. 5. For example, the UL SRS configuration message may specify bandwidth, frequency, allocated frequency resources, resource blocks, or any other feasible signal characteristic of the UL positioning SRS signal. In this manner, the feedback receiver can determine an accurate power output associated with the UL positioning SRS signal.

In some implementations, the UE 104 may measure output power in response to determining a difference between signal characteristics of a previously transmitted uplink signal and signal characteristics of a positioning SRS signal. A means for determining a difference between signal characteristics of a previously transmitted uplink signal and signal characteristics of the positioning SRS, wherein measuring the output power is in response to determining the difference between the signal characteristics of the previously transmitted uplink signal and the signal characteristics of the positioning SRS may include, e.g., the wireless transceiver 610 and one or more processors 602 with dedicated hardware or implementing executable code or software instructions in memory 604 and/or medium 620 such as the transmit output power offset determination module 626.

At block 706, the UE 104 may determine transmit output power offset for a transmission of a positioning sounding reference signal (SRS) signal via the transmit chain 320 of the UE 104 based on the output power measurement. In some implementations, the transmit output power offset may be based on a power difference between the measured transmit output power (as measured at block 704) and a reference SRS signal. The reference SRS signal may be a non-positioning SRS signal, e.g., as described in Ref 38.213 of Rel. 15 or Rel. 16 of the 3GPP specification. In some other implementations, the transmit output power offset may be based on a power difference between the measured transmit output power and any predetermined power level. A means for determining a transmit output power offset for a transmission of a positioning sounding reference signal (SRS) via the transmit chain of the UE based on the output power measurement may include, e.g., the wireless transceiver 610 and one or more processors 602 with dedicated hardware or implementing executable code or software instructions in memory 604 and/or medium 620 such as the transmit output power offset determination module 626. A means for determining a difference between an output power of a non-positioning SRS and the measured output power may include, e.g., the wireless transceiver 610 and one or more processors 602 with dedicated hardware or implementing executable code or software instructions in memory 604 and/or medium 620 such as the transmit output power offset determination module 626.

In some implementations, the determination of the transmit output power offset may be based on determining a difference between signal characteristics of a non-positioning SRS signal and a positioning SRS signal. For example, the UE 104 may determine a difference between frequency, allocated frequency resources, bandwidth and/or resource blocks associated with a positioning SRS signal and a non-positioning SRS signal. In some implementations, the determination of the transmit output power offset differences may be based on differences, greater than a threshold, of frequency, allocated frequency resources, bandwidth, and/or resource blocks of positioning and non-positioning SRS signals.

In some implementations, the determination of the transmit output power offset may be based on a relationship between resource blocks of the positioning SRS signal and the edge of the carrier bandwidth. For example, when the resource blocks are within a threshold of the edge of the carrier bandwidth, then the UE may determine the transmit output power offset. By way of example and not limitation, a threshold may be when the resource blocks are within 5-10% of the edges of the carrier bandwidth.

In some implementations, to determine the transmit output power offset, the UE 104 may configure the transmit chain 320 and/or wireless transceiver 610 to transmit a positioning SRS signal, transmit the positioning SRS signa, and measure the output power of the transmit chain 320 and/or wireless transceiver 610 through the feedback receiver 360. A means for configuring the transmit chain of the UE to transmit the positioning SRS, means for transmitting the positioning SRS via the transmit chain, and means for measuring, via a feedback receiver, the output power of the transmit chain may include, e.g., the wireless transceiver 610 and one or more processors 602 with dedicated hardware or implementing executable code or software instructions in memory 604 and/or medium 620 such as the transmit output power offset determination module 626. In some implementations, the UE 104 may prevent transmission of the positioning SRS signal by decoupling the antenna 611 or attenuating the positioning SRS signal. A means for preventing transmission of the positioning SRS via an antenna associated with the transmit chain may include, e.g., the wireless transceiver 610 and one or more processors 602 with dedicated hardware or implementing executable code or software instructions in memory 604 and/or medium 620 such as the transmit output power offset determination module 626.

At block 708, the UE 104 may transmit the positioning SRS signal at a transmit output power based on the transmit output power offset. In some implementations, the positioning SRS signal may be transmitted by the transmit chain 320 and/or the wireless transceiver 610 at a transmit output power based on the transmit output power offset. A means for transmitting the positioning SRS signal at a transmit output power based on the transmit output power offset may include, e.g., the wireless transceiver 610 and one or more processors 602 with dedicated hardware or implementing executable code or software instructions in memory 604 and/or medium 620 such as the communication module 630.

Figure 8:
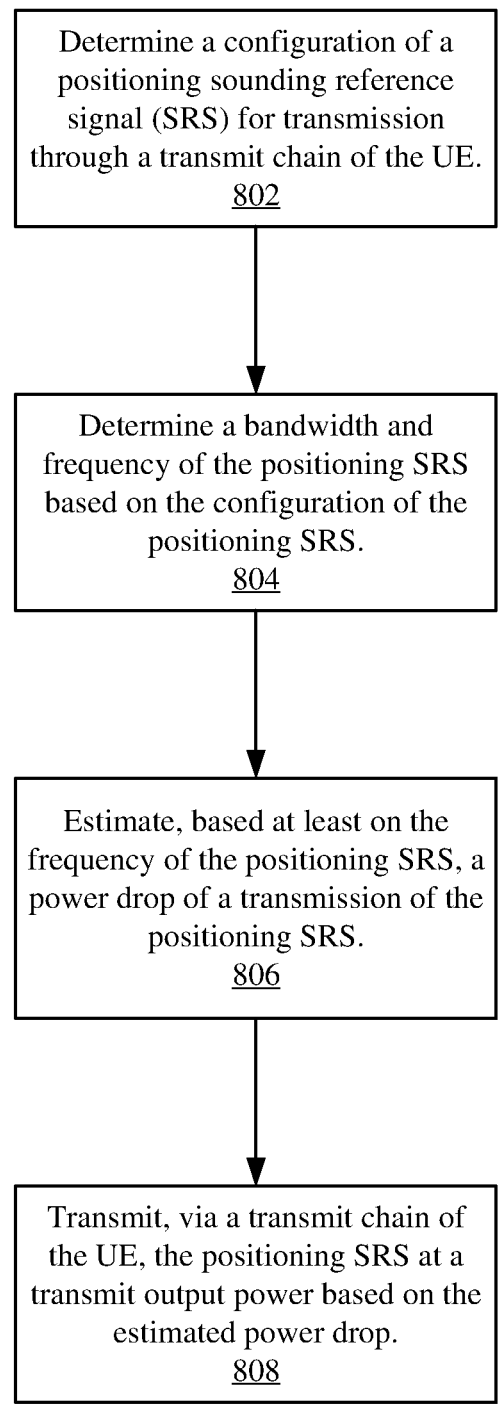
FIG. 8 shows a flowchart for an exemplary method for supporting positioning of a user equipment in a wireless network performed by a user equipment, such as the user equipment as shown in FIGS. 1 and 2 in a manner consistent with disclosed implementations.

FIG. 8 shows a flowchart for an exemplary method 800 for supporting positioning of a user equipment (UE) in a wireless network performed by a UE, such as the UE 104 as shown in FIGS. 1 and 2 in a manner consistent with disclosed implementations.

At block 802, the UE 104 determines a configuration of a positioning sounding reference signal (SRS) for transmission through a transmit chain 320 of the UE 104. In some implementations, the configuration of the positioning SRS signals may be based on a received UL SRS configuration message as described with respect to stage 3b of FIG. 5. A means for determining a configuration of a positioning sounding reference signal (SRS) for transmission through a transmit chain of the UE 104 may include, e.g., the wireless transceiver 610 and one or more processors 602 with dedicated hardware or implementing executable code or software instructions in memory 604 and/or medium 620 such as the signal characteristic determination module 628.

At block 804, the UE 104 determines a bandwidth and frequency of the positioning SRS signal based on the determined configuration of the positioning SRS signal. In some implementations, bandwidth and frequency information of the positioning SRS may be specified in the UL SRS configuration message. For example, the UL SRS configuration message may specify frequency, bandwidth, resource blocks, or any other feasible signal characteristic of the UL positioning SRS signal. A means for determining a bandwidth and frequency of the positioning SRS based on the configuration of the positioning SRS may include, e.g., the wireless transceiver 610 and one or more processors 602 with dedicated hardware or implementing executable code or software instructions in memory 604 and/or medium 620 such as the signal characteristic determination module 628.

At block 806, the UE 104 estimates, based at least on the frequency of the positioning SRS, a power drop of a transmission of the positioning SRS. For example, the UE 104 can determine power drops (e.g., transmit output power offsets) based on characteristics (e.g., frequency, resource blocks, and/or other positioning SRS signal characteristics) of the UL positioning SRS signal. In some implementations, the processor 310 may retrieve the transmit output power offset values associated with the characteristics of the UL positioning SRS signal from a look-up table. The retrieved transmit output power offset values may be estimates of a power drop of a UL positioning SRS signal. A means for estimating, based at least on the frequency of the positioning SRS, a power drop of a transmission of the positioning SRS may include, e.g., the wireless transceiver 610 and one or more processors 602 with dedicated hardware or implementing executable code or software instructions in memory 604 and/or medium 620 such as the transmit output power offset estimation module 632. A means for retrieving, from a look-up table, a transmit output power offset based on the bandwidth and frequency of the positioning SRS may include, e.g., the wireless transceiver 610 and one or more processors 602 with dedicated hardware or implementing executable code or software instructions in memory 604 and/or medium 620 such as the transmit output power offset estimation module 632. The processor 310 may also determine a reference output power associated with a non-positioning SRS signal, for example, as described with respect to Ref 38.213 of Rel. 15 or Rel. 16 of the 3GPP specification. The processor 310 may add the transmit output power offset value to the reference output power to determine the total transmit output power. In some implementations, the transmit output power data associated with characteristics of the UL positioning SRS signal may be based on data collected through bench testing and/or simulation.

In some implementations, the estimates of the power drop may be performed in response to determining temperature change greater than a threshold. For example, if the temperature of the transmit chain 320, or areas nearby the transmit chain 320, change more than a threshold amount, then the estimate of the power drop may be performed. In some other implementations, the estimates of the power drop may be performed in response to determining a change in a state change of the power amplifier 335 and/or the transmit chain 320. In some other implementations, the estimates of the power drop may be performed in response to determining a change in an allocation of SRS resources.

At block 808, the UE transmits, via a transmit chain of the UE 104, the positioning SRS at a transmit output power based on the estimated power drop. In some implementations, the positioning SRS signal may be transmitted by the transmit chain 320 and/or the wireless transceiver 610 at a power level based on the estimated power drop. A means for transmitting the positioning SRS signal at a transmit output power based on the transmit output power offset may include, e.g., the wireless transceiver 610 and one or more processors 602 with dedicated hardware or implementing executable code or software instructions in memory 604 and/or medium 620 such as the communication module 630. In some implementations, the estimated power drop may be a transmit output power offset retrieved from a look-up table. A means for transmitting the positioning SRS based on the transmit output power offset may include, e.g., the wireless transceiver 610 and one or more processors 602 with dedicated hardware or implementing executable code or software instructions in memory 604 and/or medium 620 such as the communication module 630.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

1. A method for supporting positioning of a user equipment (UE) in a wireless network performed by the UE, the method comprising: determining an unused random access channel (RACH) occasion for the UE; measuring an output power of a transmit chain of the UE during the determined unused RACH occasion; determining a transmit output power offset for a transmission of a positioning sounding reference signal (SRS) via the transmit chain of the UE based on the output power measurement; and transmitting the positioning SRS at a transmit output power based on the transmit output power offset.

2. The method of clause 1, further comprising: determining a difference between signal characteristics of a previously transmitted uplink signal and signal characteristics of the positioning SRS, wherein measuring the transmit output power is in response to determining the difference between the signal characteristics of the previously transmitted uplink signal and the signal characteristics of the positioning SRS.

3. The method of clause 2, wherein the difference between the signal characteristics of a previously transmitted uplink signal and the signal characteristics of the positioning SRS includes a difference in allocated frequency resources of the respective signals, greater than a threshold.

4. The method of any of clauses 2-3, wherein the difference between the signal characteristics of the previously transmitted uplink signal and the signal characteristics of the positioning SRS includes a difference in resource blocks of the respective signals.

5. The method of any of clauses 2-4, wherein the difference between the signal characteristics of the previously transmitted uplink signal and the signal characteristics of the positioning SRS is based on resource blocks of the positioning SRS within a threshold of an edge of a carrier bandwidth.

6. The method of any of clauses 1-5, wherein determining the unused RACH occasion further comprises selecting an unused RACH occasion that occurs prior to a scheduled transmission of the positioning SRS.

7. The method of any of clauses 1-6, wherein measuring the output power comprises: configuring the transmit chain of the UE to transmit the positioning SRS; transmitting the positioning SRS via the transmit chain; and measuring, via a feedback receiver, the output power of the transmit chain.

8. The method of clause 7, further comprising attenuating the positioning SRS prior to an antenna associated with the transmit chain.

9. The method of any of clauses 1-8, wherein determining the transmit output power offset further comprises: determining a difference between an output power of a non-positioning SRS and the measured output power.

10. The method of any of clauses 1-9, wherein measuring the output power is in response to determining a temperature change greater than a threshold.

11. The method of any of clauses 1-9, wherein measuring the output power is in response to determining a change in a state of a power amplifier in the transmit chain.

12. The method of any of clauses 1-9, wherein measuring the output power is in response to determining a change in an allocation of SRS resources.

13. A user equipment (UE) configured for supporting positioning of the UE in a wireless network comprising: a wireless transceiver configured to wirelessly communicate with entities in a wireless network; at least one memory; at least one processor coupled to the wireless transceiver and the at least one memory, wherein the at least one processor is configured to: determine an unused random access channel (RACH) occasion for the UE; measure an output power of a transmit chain of the UE during the determined unused RACH occasion; determine a transmit output power offset for a transmission of a positioning sounding reference signal (SRS) via the transmit chain of the UE based on the output power measurement; and transmit the positioning SRS at a transmit output power based on the transmit output power offset.

14. The UE of clause 13, wherein the at least one processor is further configured to: determine a difference between signal characteristics of a previously transmitted uplink signal and signal characteristics of the positioning SRS, wherein measuring the output power is in response to determining the difference between the signal characteristics of the previously transmitted uplink signal and the signal characteristics of the positioning SRS.

15. The UE of clause 14, wherein the difference between the signal characteristics of the previously transmitted uplink signal and the signal characteristics of the positioning SRS includes a difference in allocated frequency resources of the respective signals that is greater than a threshold.

16. The UE of any of clauses 14-15, wherein the difference between the signal characteristics of the previously transmitted uplink signal and the signal characteristics of the positioning SRS includes a difference in resource blocks of the respective signals.

17. The UE of any of clauses 14-16, wherein the difference between the signal characteristics of the previously transmitted uplink signal and the signal characteristics of the positioning SRS is based on resource blocks of the positioning SRS within a threshold of an edge of a carrier bandwidth.

18. The UE of any of clauses 13-17, wherein to determine the unused RACH occasion, the at least one processor is further configured to select an unused RACH occasion that occurs prior to a scheduled transmission of the positioning SRS.

19. The UE of any of clauses 13-18, wherein to determine the transmit output power offset, the at least one processor is further configured to: configure the transmit chain of the UE to transmit the positioning SRS; transmit the positioning SRS via the transmit chain; and measure, via a feedback receiver, the output power of the transmit chain;

20. The UE of clause 19, wherein the at least one processor is configured to prevent transmission of the positioning SRS via an antenna associated with the transmit chain.

21. The UE of any of clauses 13-20, wherein to determine the transmit output power offset the at least one processor is configured to determine a difference between an output power of a non-positioning SRS and the measured output power.

22. The UE of any of clauses 13-21, wherein the at least one processor is configured to measure the output power in response to a determination of a temperature change greater than a threshold.

23. The UE of any of clauses 13-21, wherein the at least one processor is configured to measure the output power in response to a determination of a change in a state of a power amplifier in the transmit chain.

24. The UE of any of clauses 13-21, wherein the at least one processor is configured to measure the output power in response to a determination of a change in an allocation of SRS resources.

25. A user equipment (UE) configured for supporting positioning of the UE in a wireless network comprising: means for determining an unused random access channel (RACH) occasion for the UE, means for measuring an output power of a transmit chain of the UE during the determined unused RACH occasion; means for determining a transmit output power offset for a transmission of a positioning sounding reference signal (SRS) via the transmit chain of the UE based on the output power measurement; and means for transmitting the positioning SRS at a transmit output power based on the transmit output power offset.

26. The UE of clause 25, further comprising: means for determining a difference between signal characteristics of a previously transmitted uplink signal and signal characteristics of the positioning SRS, wherein measuring the output power is in response to determining the difference between the signal characteristics of the previously transmitted uplink signal and the signal characteristics of the positioning SRS.

27. The UE of clause 26, wherein the difference between the signal characteristics of a previously transmitted uplink signal and the signal characteristics of the positioning SRS includes a difference in allocated frequency resources of the respective signals, greater than a threshold.

28. The UE of any of clauses 26-27, wherein the difference between the signal characteristics of the previously transmitted uplink signal and the signal characteristics of the positioning SRS includes a difference in resource blocks of the respective signals.

29. The UE of any of clauses 26-28, wherein the difference between the signal characteristics of the previously transmitted uplink signal and the signal characteristics of the positioning SRS is based on resource blocks of the positioning SRS within a threshold of an edge of a carrier bandwidth.

30. The UE of any of clauses 25-29, wherein the means for determining the unused RACH occasion further comprises a means for selecting an unused RACH occasion that occurs prior to a scheduled transmission of the positioning SRS.

31. The UE of any of clauses 25-30, wherein the means for determining transmit output power offset further comprises: means for configuring the transmit chain of the UE to transmit the positioning SRS; means for transmitting the positioning SRS via the transmit chain; and means for measuring, via a feedback receiver, the output power of the transmit chain.

32. The UE of clause 31, further comprising means for preventing transmission of the positioning SRS via an antenna associated with the transmit chain.

33. The UE of any of clauses 25-32, wherein the means for determining the transmit output power offset further comprises: means for determining a difference between an output power of a non-positioning SRS and the measured output power.

34. The UE of any of clauses 25-33, wherein the means for measuring the output power is in response to determining a temperature change greater than a threshold.

35. The UE of any of clauses 25-33, wherein the means for measuring the output power is in response to determining a change in a state of a power amplifier in the transmit chain.

36. The UE of any of clauses 25-33, wherein the means for measuring the output power is in response to determining a change in an allocation of SRS resources.

37. A non-transitory computer readable storage medium including program code stored thereon, the program code operable to configure at least one processor in a user equipment (UE) to support positioning, comprising: program code to determine an unused random access channel (RACH) occasion for the UE; program code to measure an output power of a transmit chain of the UE during the determined unused RACH occasion; program code to determine a transmit output power offset for a transmission of a positioning sounding reference signal (SRS) via the transmit chain of the UE based on the output power measurement; and program code to transmit the positioning SRS at a transmit output power based on the transmit output power offset. 31. A method for supporting positioning of a user equipment (UE) in a wireless network performed by the UE, the method comprising: determining a configuration of a positioning sounding reference signal (SRS) for transmission through a transmit chain of the UE; determining a bandwidth and frequency of the positioning SRS based on the configuration of the positioning SRS; estimating, based at least on the frequency of the positioning SRS, a power drop of a transmission of the positioning SRS; and transmitting, via a transmit chain of the UE, the positioning SRS at a transmit output power based on the estimated power drop.

38. The non-transitory computer readable storage medium of clause 37, further comprising: program code to determine a difference between signal characteristics of a previously transmitted uplink signal and signal characteristics of the positioning SRS, wherein measuring the output power is in response to determining the difference between the signal characteristics of the previously transmitted uplink signal and the signal characteristics of the positioning SRS.

39. The non-transitory computer readable storage medium of clause 38, wherein the difference between the signal characteristics of the previously transmitted uplink signal and the signal characteristics of the positioning SRS includes a difference in allocated frequency resources of the respective signals that is greater than a threshold.

40. The non-transitory computer readable storage medium of any of clauses 38-39, wherein the difference between the signal characteristics of the previously transmitted uplink signal and the signal characteristics of the positioning SRS includes a difference in resource blocks of the respective signals.

41. The non-transitory computer readable storage medium of any of clauses 38-40, wherein the difference between the signal characteristics of the previously transmitted uplink signal and the signal characteristics of the positioning SRS is based on resource blocks of the positioning SRS within a threshold of an edge of a carrier bandwidth.

42. The non-transitory computer readable storage medium of any of clauses 37-41, wherein program code to determine the unused RACH occasion comprises: program code to select an unused RACH occasion that occurs prior to a scheduled transmission of the positioning SRS.

43. The non-transitory computer readable storage medium of any of clauses 37-42, wherein program code to measure the output power comprises: program code to configure the transmit chain of the UE to transmit the positioning SRS; program code to transmit the positioning SRS via the transmit chain; and program code to measure via a feedback receiver, the output power of the transmit chain.

44. The non-transitory computer readable storage medium of clause 43, further comprising: program code to prevent transmission of the positioning SRS via an antenna associated with the transmit chain.

45. The non-transitory computer readable medium of any of clauses 37-44, wherein the program code to determine the transmit output power offset further comprises: program code to determine a difference between an output power of a non-positioning SRS and the measured output power.

46. The non-transitory computer readable medium of any of clauses 37-45, wherein the program code to measure the output power further comprises program code to determine a temperature change greater than a threshold.

47. The non-transitory computer readable medium of any of clauses 37-45, wherein the program code to measure the output power further comprises program code to determine a change in a state of a power amplifier in the transmit chain.

48. The non-transitory computer readable medium of any of clauses 37-45, wherein the program code to measure the output power further comprises program code to determine a change in an allocation of SRS resources.

49. A method for supporting positioning of a user equipment (UE) in a wireless network performed by the UE, the method comprising: determining a configuration of a positioning sounding reference signal (SRS) for transmission through a transmit chain of the UE; determining a bandwidth and frequency of the positioning SRS based on the configuration of the positioning SRS; estimating, based at least on the frequency of the positioning SRS, a power drop of a transmission of the positioning SRS; and transmitting, via a transmit chain of the UE, the positioning SRS at a transmit output power based on the estimated power drop.

50. The method of clause 49, wherein estimating the power drop comprises: retrieving, from a look-up table, a transmit output power offset based on the bandwidth and frequency of the positioning SRS; and transmitting the positioning SRS based on the transmit output power offset.

51. The method of clause 49-50, wherein the estimated power drop is based on a characterization of the transmit chain.

52. The method of any of clauses 49-51, wherein estimating the power drop is in response to determining a temperature change greater than a threshold.

53. The method of any of clauses 49-51, wherein estimating the power drop is in response to determining a change in a state of a power amplifier in the transmit chain.

54. The method of any of clauses 49-51, wherein estimating the power drop is in response to determining a change in an allocation of SRS resources.

55. A user equipment (UE) configured for supporting positioning of the UE in a wireless network comprising: a wireless transceiver configured to wirelessly communicate with entities in a wireless network; at least one memory; at least one processor coupled to the wireless transceiver and the at least one memory, wherein the at least one processor is configured to: determine a configuration of a positioning sounding reference signal (SRS) for transmission through a transmit chain of the UE; determine a bandwidth and frequency of the positioning SRS based on the configuration of the positioning SRS; estimate, based at least on the frequency of the positioning SRS, a power drop of a transmission of the positioning SRS; and transmit, via a transmit chain of the UE, the positioning SRS at a transmit output power based on the estimated power drop.

56. The UE of clause 55, wherein to estimate the power drop, the at least one processor is further configured to: retrieve, from a look-up table, a transmit output power offset based on the bandwidth and frequency of the positioning SRS; and transmit the positioning SRS based on the transmit output power offset.

57. The UE of any of clauses 55-56, wherein the estimated power drop is based on a characterization of the transmit chain.

58. The UE of any of clauses 55-57, wherein the at least one processor is configured to estimate the power drop in response to determining a temperature change greater than a threshold.

59. The UE of any of clauses 55-57, wherein the at least one processor is configured to estimate the power drop in response to a determination of a change in a state of a power amplifier in the transmit chain.

60. The UE of any of clauses 55-57, wherein the at least one processor is configured to estimate the power drop in response to a determination of a change in an allocation of SRS resources.

61. A user equipment (UE) configured for supporting positioning of the UE in a wireless network comprising: means for determining a configuration of a positioning sounding reference signal (SRS) for transmission through a transmit chain of the UE; means for determining a bandwidth and frequency of the positioning SRS based on the configuration of the positioning SRS; means for estimating, based at least on the frequency of the positioning SRS, a power drop of a transmission of the positioning SRS; means for transmitting, via a transmit chain of the UE, the positioning SRS at a transmit output power based on the estimated power drop.

62. The UE of clause 61, wherein the means for estimating the power drop comprises: means for retrieving, from a look-up table, a transmit output power offset based on the bandwidth and frequency of the positioning SRS; and means for transmitting the positioning SRS based on the transmit output power offset.

63. The UE of any of clauses 61-62, wherein the means for estimating the power drop is based on a characterization of the transmit chain.

64. The UE of any of clauses 61-63, wherein the means for estimating the power drop is in response to a determination of a temperature change greater than a threshold.

65. The UE of any of clauses 61-63, wherein the means for estimating the power drop is in response to a determination of a change of a state of a power amplifier in the transmit chain.

66. The UE of any of clauses 61-63, wherein the means for estimating the power drop is in response to a determination of a change in an allocation of SRS resources.

67. A non-transitory computer readable storage medium including program code stored thereon, the program code operable to configure at least one processor in a user equipment (UE) to support positioning, comprising: program code to determine a configuration of a positioning sounding reference signal (SRS) for transmission through a transmit chain of the UE; program code to determine a configuration of a positioning sounding reference signal (SRS) for transmission through a transmit chain of the UE; program code to determine a bandwidth and frequency of the positioning SRS based on the configuration of the positioning SRS; program code to estimate, based at least on the frequency of the positioning SRS, a power drop of a transmission of the positioning SRS; and program code to transmit, via a transmit chain of the UE, the positioning SRS at a transmit output power based on the estimated power drop.

68. The non-transitory computer readable medium of clause 67, wherein the program code to estimate the power drop further comprises: program code to retrieve, from a look-up table, a transmit output power offset based on the bandwidth and frequency of the positioning SRS; and program code to transmit the positioning SRS based on the transmit output power offset.

69. The non-transitory computer readable medium of any of clauses 67-68, wherein the estimated power drop is based on a characterization of the transmit chain.

70. The non-transitory computer readable medium of any of clauses 67-69, wherein estimation of the power drop is in response to determining a temperature change greater than a threshold.

71. The non-transitory computer readable medium of any of clauses 67-69, wherein estimation of the power drop is in response to determining a change in a state of a power amplifier in the transmit chain.

72. The non-transitory computer readable medium of any of clauses 67-69, wherein estimation of the power drop is in response to determining a change in an allocation of SRS resources.

Therefore, it is intended that claimed subject matter not be limited to the particular examples disclosed, but that such claimed subject matter may also include all aspects falling within the scope of appended claims, and equivalents thereof.

What is claimed:

1. A method for supporting positioning of a user equipment (UE) in a wireless network performed by the UE, the method comprising:
determining an unused random access channel (RACH) occasion for the UE;
measuring an output power of a transmit chain of the UE during the determined unused RACH occasion;
determining a transmit output power offset for a transmission of a positioning sounding reference signal (SRS) via the transmit chain of the UE based on the output power measurement; and
transmitting the positioning SRS at a transmit output power based on the transmit output power offset.

2. The method of claim 1, further comprising:
determining a difference between signal characteristics of a previously transmitted uplink signal and signal characteristics of the positioning SRS, wherein measuring the output power is in response to determining the difference between the signal characteristics of the previously transmitted uplink signal and the signal characteristics of the positioning SRS.

3. The method of claim 2, wherein the difference between the signal characteristics of the previously transmitted uplink signal and the signal characteristics of the positioning SRS includes a difference in allocated frequency resources of the respective signals that is greater than a threshold.

4. The method of claim 2, wherein the difference between the signal characteristics of the previously transmitted uplink signal and the signal characteristics of the positioning SRS includes a difference in resource blocks of the respective signals.

5. The method of claim 2, wherein the difference between the signal characteristics of the previously transmitted uplink signal and the signal characteristics of the positioning SRS is based on resource blocks of the positioning SRS within a threshold of an edge of a carrier bandwidth.

6. The method of claim 1, wherein determining the unused RACH occasion further comprises selecting an unused RACH occasion that occurs prior to a scheduled transmission of the positioning SRS.

7. The method of claim 1, wherein measuring the output power comprises:
configuring the transmit chain of the UE to transmit the positioning SRS;
transmitting the positioning SRS via the transmit chain; and
measuring, via a feedback receiver, the output power of the transmit chain.

8. The method of claim 7, further comprising preventing transmission of the positioning SRS via an antenna associated with the transmit chain.

9. The method of claim 1, wherein determining the transmit output power offset further comprises:
determining a difference between an output power of a non-positioning SRS and the measured output power.

10. The method of claim 1, wherein measuring the output power is in response to determining a temperature change greater than a threshold.

11. The method of claim 1, wherein measuring the output power is in response to determining a change in a state of a power amplifier in the transmit chain.

12. The method of claim 1, wherein measuring the output power is in response to determining a change in an allocation of SRS resources.

13. A user equipment (UE) configured for supporting positioning of the UE in a wireless network comprising:
a wireless transceiver configured to wirelessly communicate with entities in a wireless network;
at least one memory;

at least one processor coupled to the wireless transceiver and the at least one memory, wherein the at least one processor is configured to:
- determine an unused random access channel (RACH) occasion for the UE;
- measure an output power of a transmit chain of the UE during the determined unused RACH occasion;
- determine a transmit output power offset for a transmission of a positioning sounding reference signal (SRS) via the transmit chain of the UE based on the output power measurement; and
- transmit the positioning SRS at a transmit output power based on the transmit output power offset.

14. The UE of claim 13, wherein the at least one processor is further configured to:
- determine a difference between signal characteristics of a previously transmitted uplink signal and signal characteristics of the positioning SRS, wherein measuring the output power is in response to determining the difference between the signal characteristics of the previously transmitted uplink signal and the signal characteristics of the positioning SRS.

15. The UE of claim 14, wherein the difference between the signal characteristics of the previously transmitted uplink signal and the signal characteristics of the positioning SRS includes a difference in allocated frequency resources of the respective signals that is greater than a threshold.

16. The UE of claim 14, wherein the difference between the signal characteristics of the previously transmitted uplink signal and the signal characteristics of the positioning SRS includes a difference in resource blocks of the respective signals.

17. The UE of claim 14, wherein the difference between the signal characteristics of the previously transmitted uplink signal and the signal characteristics of the positioning SRS is based on resource blocks of the positioning SRS within a threshold of an edge of a carrier bandwidth.

18. The UE of claim 13, wherein to determine the unused RACH occasion, the at least one processor is further configured to select an unused RACH occasion that occurs prior to a scheduled transmission of the positioning SRS.

19. The UE of claim 13, wherein to determine the transmit output power offset, the at least one processor is further configured to:
- configure the transmit chain of the UE to transmit the positioning SRS;
- transmit the positioning SRS via the transmit chain; and
- measure, via a feedback receiver, the output power of the transmit chain.

20. The UE of claim 19, wherein the at least one processor is configured to prevent transmission of the positioning SRS via an antenna associated with the transmit chain.

21. The UE of claim 13, wherein to determine the transmit output power offset the at least one processor is configured to determine a difference between an output power of a non-positioning SRS and the measured output power.

22. The UE of claim 13, wherein the at least one processor is configured to measure the output power in response to a determination of a temperature change greater than a threshold.

23. The UE of claim 13, wherein the at least one processor is configured to measure the output power in response to a determination of a change in a state of a power amplifier in the transmit chain.

24. The UE of claim 13, wherein the at least one processor is configured to measure the output power in response to a determination of a change in an allocation of SRS resources.

25. A user equipment (UE) configured for supporting positioning of the UE in a wireless network comprising:
- means for determining an unused random access channel (RACH) occasion for the UE;
- means for measuring an output power of a transmit chain of the UE during the determined unused RACH occasion;
- means for determining a transmit output power offset for a transmission of a positioning sounding reference signal (SRS) via the transmit chain of the UE based on the output power measurement; and
- means for transmitting the positioning SRS at a transmit output power based on the transmit output power offset.

26. The UE of claim 25, further comprising:
- means for determining a difference between signal characteristics of a previously transmitted uplink signal and signal characteristics of the positioning SRS, wherein measuring the output power is in response to determining the difference between the signal characteristics of the previously transmitted uplink signal and the signal characteristics of the positioning SRS.

27. The UE of claim 26, wherein the difference between the signal characteristics of the previously transmitted uplink signal and the signal characteristics of the positioning SRS includes a difference in allocated frequency resources of the respective signals that is greater than a threshold.

28. The UE of claim 26, wherein the difference between the signal characteristics of the previously transmitted uplink signal and the signal characteristics of the positioning SRS includes a difference in resource blocks of the respective signals.

29. The UE of claim 26, wherein the difference between the signal characteristics of the previously transmitted uplink signal and the signal characteristics of the positioning SRS is based on resource blocks of the positioning SRS within a threshold of an edge of a carrier bandwidth.

30. A non-transitory computer readable storage medium including program code stored thereon, the program code operable to configure at least one processor in a user equipment (UE) to support positioning, comprising:
- the program to determine an unused random access channel (RACH) occasion for the UE;
- the program to measure an output power of a transmit chain of the UE during the determined unused RACH occasion;
- the program to determine a transmit output power offset for a transmission of a positioning sounding reference signal (SRS) via the transmit chain of the UE based on the output power measurement; and
- the program to transmit the positioning SRS at a transmit output power based on the transmit output power offset.

* * * * *